Dec. 7, 1926.
F. H. REYNOLDS
ROLL FILM CAMERA
Filed June 2, 1925
1,610,153
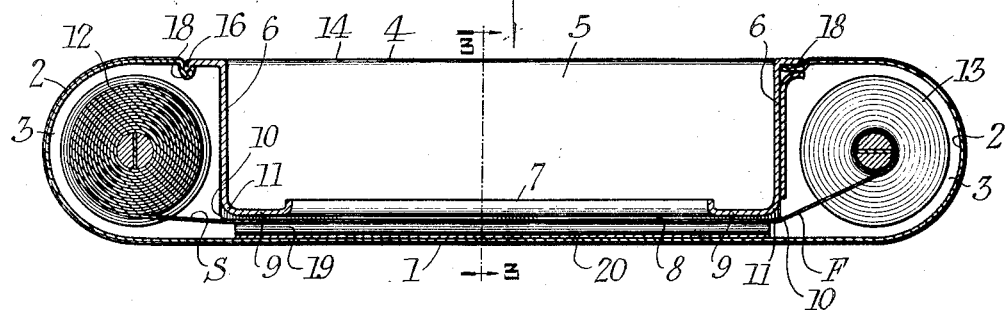
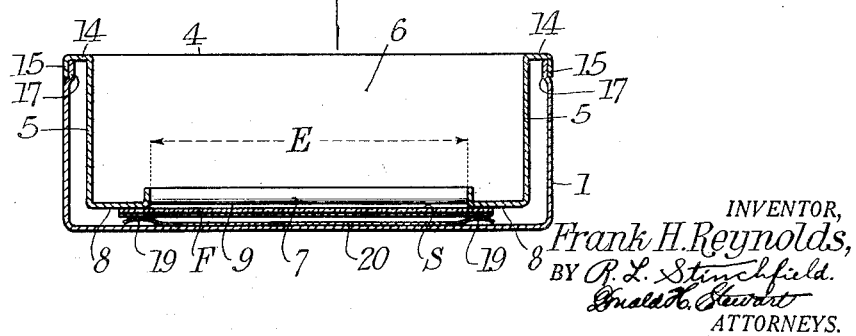
INVENTOR,
Frank H. Reynolds,
BY R. L. Stinchfield.
Donald H. Stewart
ATTORNEYS.

Patented Dec. 7, 1926.

1,610,153

UNITED STATES PATENT OFFICE.

FRANK H. REYNOLDS, OF ROCHESTER, NEW YORK, ASSIGNOR TO EASTMAN KODAK COMPANY, OF ROCHESTER, NEW YORK, A CORPORATION OF NEW YORK.

ROLL-FILM CAMERA.

Application filed June 2, 1925. Serial No. 34,418.

This invention relates to photography and more particularly to photographic cameras. One object is to provide a construction which is suitable for use in the modern compact cameras. Another object is to provide an exposure frame over which the film is drawn and held flat which will eliminate scratches from the film. Another object is to provide a camera from which the usual film guide rolls may be omitted without sacrificing the quality of the resulting pictures. Another object is to provide an exposure frame which may support the film by the edges only so that the central area of the film which is adapted to receive the latent image will contact only with the film spools upon which it is wound, and other objects will appear from the following specification, the novel features being pointed out in the claims at the end of the specification.

Compactness has lately become a feature of most modern roll film cameras, and it is difficult to obtain small size without loss of efficiency. Guide rolls leading to and from the bellows frame necessarily increase the length of a camera, and this invention is particularly directed to reducing the camera size by eliminating the guide rollers and their supporting yokes, and, at the same time, providing an exposure frame on which the film may be held flat, and over which it may be wound without scratching.

Coming now to the drawing wherein like reference characters denote like parts throughout;

Fig. 1 is a perspective view of a part of a camera having an exposure frame constructed in accordance with, and illustrating one embodiment of my invention;

Fig. 2 is a section through a camera, the unessential parts of which have been omitted for the sake of clearness; and Fig. 3 is a section on line 3—3 of Fig. 2.

By way of illustration, I have shown my invention as forming a part of a camera of the type in U. S. Patent No. 1,218,135 for photographic camera, patented March 6, 1917 by E. E. Underwood and myself. Obviously, certain features of the present invention are equally applicable to different types of roll film cameras.

The camera may consist of a casing 1, the ends of which are rounded at 2 to form spool chambers 3. There is a removable body portion 4 which is in the form of a box-like structure having side walls 5 and end walls 6. On one end of this box there is an exposure frame, designated broadly as 7, consisting of side frame members 8 and end frame members 9, the flat surface of the members 8 and 9 lying in different planes. The side members 8 extend from the end wall 6 of the body portion, there being a curved wall 10 joining the frame members to wall 6. The end frame members 9 are also provided with curved walls 11 which connect these walls to wall 6. It should be noted that the curved walls 10 and 11 are offset, so that when film F is drawn from a supply spool 12 to a take-up spool 13, the film will be caused to lie flat along the side frame member 8, in which position it will be spaced from the end frame members 9, so that that portion of the film designated by E in Fig. 3, will not contact with any portion of the exposure frame 7, and will not be scratched or otherwise marred.

In Fig. 2, the film F is diagrammatically shown as a single thickness of material. As a matter of fact, the film strip ordinarily comprises a strip of film and film backing paper or a strip of film, carbon paper and backing paper such as is well known to those familiar with the photographic art.

On the opposite side from the exposure frame 7 there is an outwardly extending flange 14, the side edges of which 15 and the end edges of which 16 are provided with downwardly extending flanges which engage with a light-tight connection the upper edges 17 and 18 of the camera body 1. When this camera is to be loaded, the box-like central portion 4 is removed, as described in the patent above cited. I prefer to provide longitudinal spring members 19, which, as shown in Fig. 3, may be formed from the edges of a spring sheet 20 fastened to the camera body. The springs 19 press the film F into contact with the side members 8 of the exposure frame, so that the film is pressed flat in the focal plane of the camera.

As is best shown in Fig. 2, when the film strip $f$ is drawn from the supply spool 12 around the curved wall 10 and across the exposure frame 7, the film is bent so that it has a natural tendency to lie flat. This figure also shows that the sensitive side S of the film does not contact with the curved wall 10, and is spaced from the flat surface of the end walls 9 of the exposure frame, so that the area of the film which is adapted to receive a latent image does not contact with any part of the camera itself, but solely upon the convolutions of the film band as they are wound upon the take-up spool 13.

Having thus described my invention, what I claim as new and desire to secure by Letters Patent is:

1. In a roll film camera, the combination of camera walls forming two spool chambers adapted to receive film spools, with a body portion adapted to support a film in position for exposure, an exposure frame through which an exposure may be made when a film is drawn from one spool to the other across the exposure frame, said exposure frame comprising side and end walls lying in different planes one from the other, said side walls including curved walls along the ends of the frame, and said end walls including curved edges along the ends of the frame, the two curved walls being offset with respect to each other, whereby a film may be drawn across the exposure frame in contact with the side walls and at least portions of the curved walls at the ends thereof, and spaced from the end walls and their curved walls.

2. In a roll film camera, the combination of camera walls forming spool chambers adapted to receive film spools, with a body portion adapted to support a frame across which a film may be drawn flat for exposure, said body portion including a box-like structure having side and end walls, and an exposure frame forming a partial closure for the box-like structure and also having side and end walls positioned in different planes, curved walls leading from an end wall of the box-like structure to the side frame members and to an end frame member, the curved walls leading to the side and end exposure frame members being offset one from another, whereby that portion of the film which may be exposed through the exposure frame will be held from contact with the end portions of the exposure frame.

Signed at Rochester, New York this 28th day of May, 1925.

FRANK H. REYNOLDS.